United States Patent [19]
Szanto

[11] Patent Number: 5,681,139
[45] Date of Patent: Oct. 28, 1997

[54] LIFTING TROLLEY

[76] Inventor: Joseph Szanto, 28 Peter Parade, Old Toongabbie, Sydney, Australia, 2146

[21] Appl. No.: 745,320

[22] Filed: Nov. 12, 1996

Related U.S. Application Data

[63] Continuation-in-part of Ser. No. 356,074, Dec. 14, 1994, abandoned.

[51] Int. Cl.$^6$ ........................................................ B60P 1/02
[52] U.S. Cl. ........................ 414/495; 254/4 R; 254/4 C
[58] Field of Search ............................... 414/490, 495; 254/4 R, 4 B, 4 C, 5 R, 5 B, 5 C, 10 C; 187/233, 231

[56] References Cited

U.S. PATENT DOCUMENTS

| | | | |
|---|---|---|---|
| 301,229 | 7/1884 | Gray | 187/233 |
| 320,418 | 6/1885 | Walker | 254/4 C |
| 368,883 | 8/1887 | Forbes | 254/4 C |
| 750,671 | 1/1904 | Little | 254/4 R |
| 1,194,105 | 8/1916 | Whalley | 254/5 C |
| 1,378,466 | 5/1921 | Kimber | 254/4 C |
| 2,152,849 | 4/1939 | Hennessy | 254/4 C |
| 2,214,005 | 9/1940 | Zeindler | 254/4 C |
| 2,992,811 | 7/1961 | Turner | 254/4 B |
| 3,809,268 | 5/1974 | Lutz | 414/343 |

*Primary Examiner*—Thomas J. Brahan
*Attorney, Agent, or Firm*—Hazel & Thomas

[57] ABSTRACT

A lifting trolley having a main frame supported on ground engaging wheels, a handle pivotally connected to the main frame and a lifting sub-frame which is vertically movable with respect to the main frame is disclosed. The sub-frame has a pair of spaced apart arms, each of which include retractable engagement means in the form of pivoting catch members that are adapted to secure a load, such as a stack of crates, to the sub-frame. Linkage means, such as a pulley and cable assembly between the handle and sub-frame, enabling pivotal movement of the handle to cause vertical movement of the sub-frame with respect to the main frame is also disclosed. The trolley includes releasable catch means, such as a first catch assembly between the handle and the main frame and a second catch assembly between the sub-frame and the main frame that is adapted to lock the sub-frame to the main frame, so that only upon release of the catch means and the pivotal movement of the handle may the sub-frame be raised or lowered to a desired height.

12 Claims, 5 Drawing Sheets

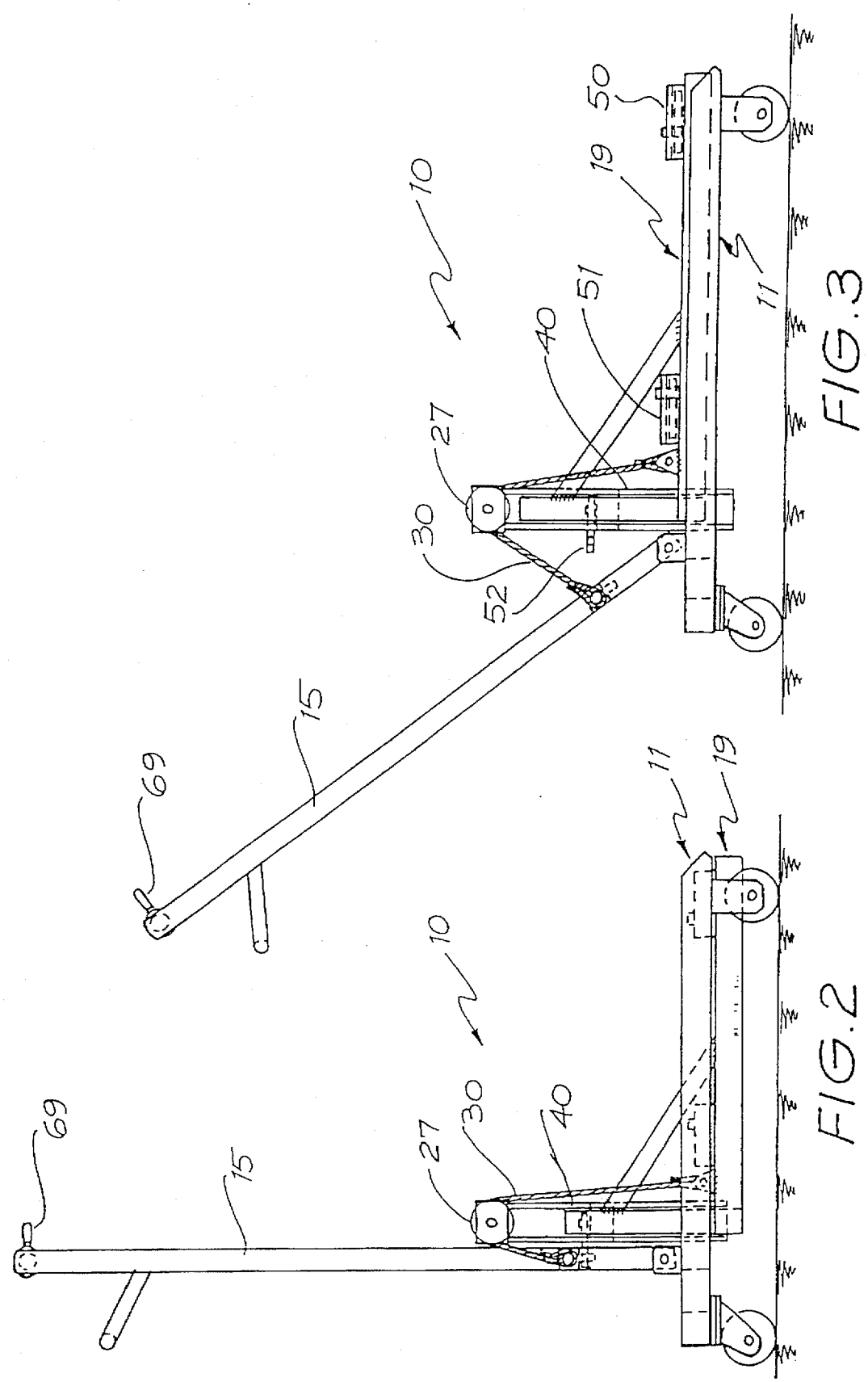

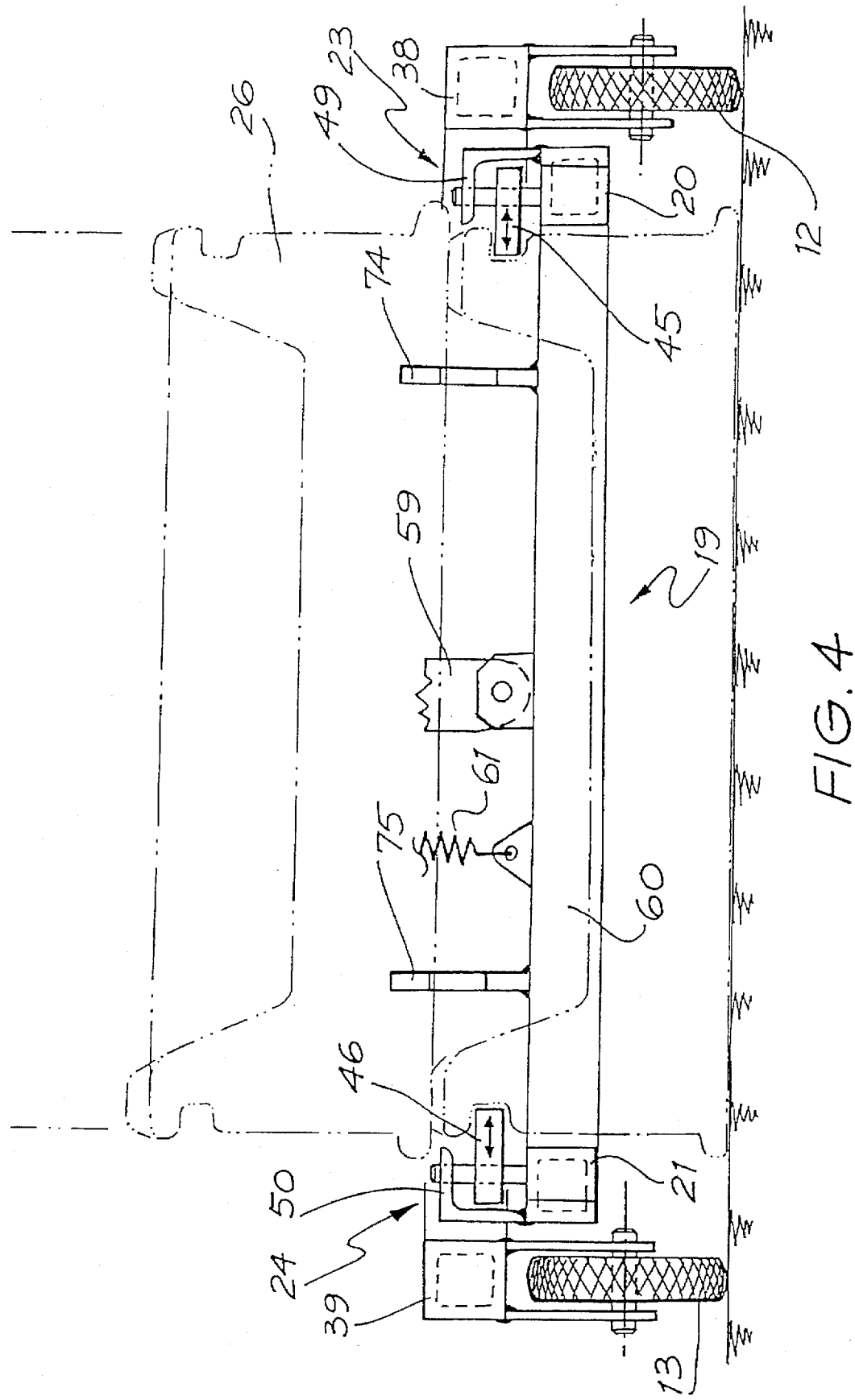

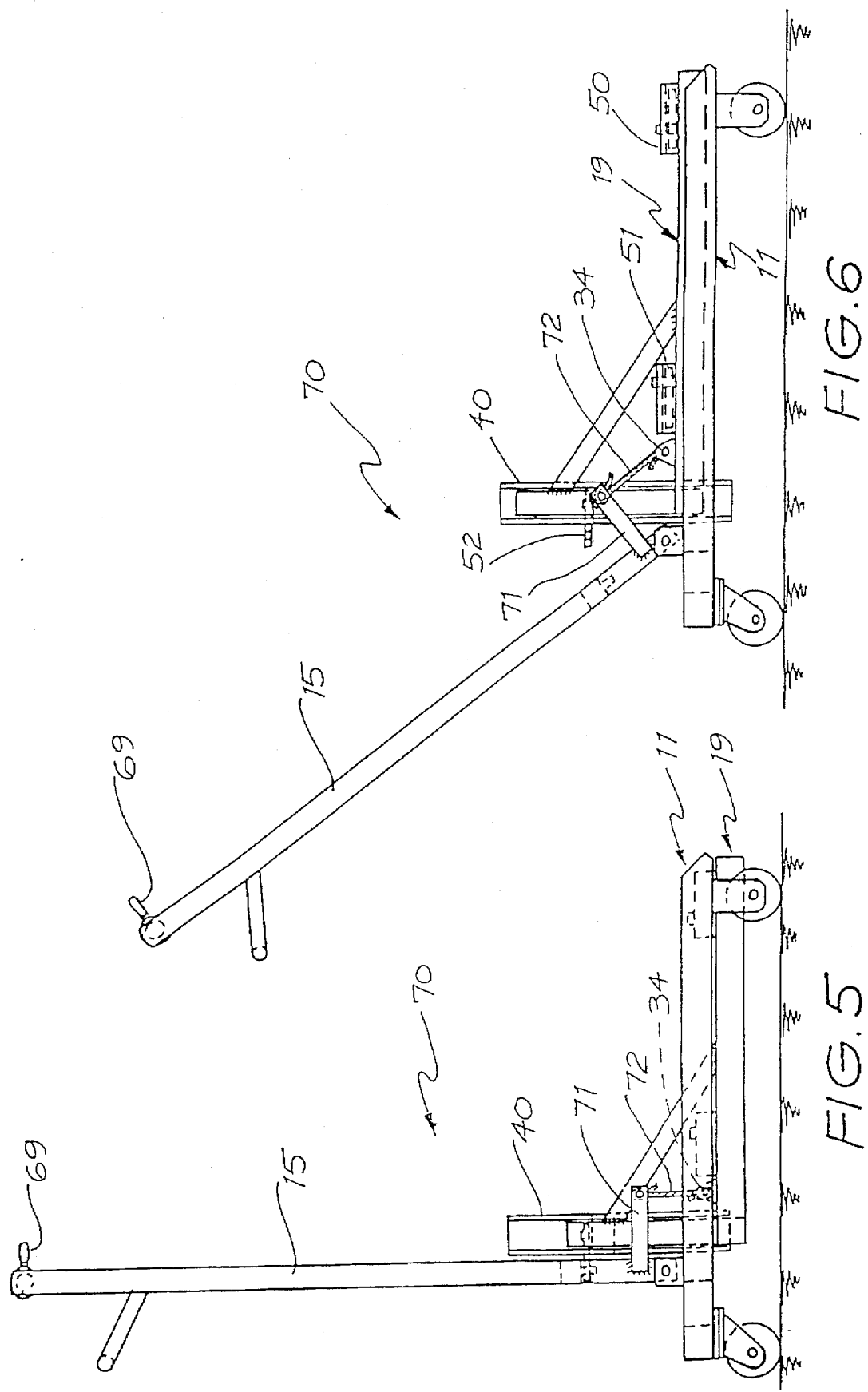

1
LIFTING TROLLEY

RELATED APPLICATIONS

This application is a continuation-in-part application of U.S. patent application Ser. No. 08/356,074, filed on Dec. 14, 1994, now abandoned.

FIELD OF THE INVENTION

The present invention relates to lifting trollies and, in particular, to a trolley for lifting and transporting crates and the like in a safe and energy efficient manner.

BACKGROUND OF THE INVENTION

Conventionally, stacked crates, such as those used in the bread industry, have been lifted and transported over relatively short distances, such as may be required at a bread making factory, with the aid of rigid trolleys or on pallets carried by fork lift trucks from one location in the factory to another. Such methods require that the stacked crates be manually loaded onto the rigid trolley or pallet and similarly unloaded therefrom at the desired destination. Human physical exertion is therefore necessary for the movement of such crates and this may occasionally lead to physical injury. Also, valuable time may be consumed in loading the crates onto a rigid trolley or pallet for subsequent movement.

It is an object of the present invention to provide a lifting trolley that can securely engage a crate or stack of crates resting on the ground and lift the same off the ground to a height where the crate or stack thereof may be transported stably by urging the trolley in a desired direction.

BRIEF SUMMARY OF THE INVENTION

According to the present invention, there is provided a lifting trolley comprising:
  a main frame supported on ground engaging wheels;
  a handle pivotally connected to the main frame;
  a lifting sub-frame vertically movable with respect to the main frame;
  the sub-frame including a pair of spaced apart arms, each arm including retractable engagement means adapted to secure a load to the sub-frame;
  linkage means between the handle and sub-frame whereby pivotal movement of the handle causes vertical movement of the sub-frame with respect to the main frame; and
  releasable catch means adapted to lock the sub-frame to the main frame,
  the arrangement being such that when the catch means is released, the handle may be pivotally moved so as to cause the sub-frame to be raised or lowered to a desired height.

Preferably, the releasable catch means includes a first releasable catch assembly for locking the handle to the main frame at a first height of the sub-frame necessary for enabling the retractable engagement means to engage a load located on the ground, and a second releasable catch assembly for locking the sub-frame to the main frame at a second height of the sub-frame necessary for transporting the load on the trolley, the arrangement being such that when the first releasable catch assembly is released and the handle pivoted to a predetermined degree in a first pivotal direction, the sub-frame will be raised, thereby raising the load, to the said second height where the second releasable catch assembly locks the sub-frame to the main frame, and the load may be transported, and when the second releasable catch assembly is handle pivoted to a predetermined degree in a second pivotal direction, the sub-frame will be lowered, thereby lowering the load, to the said first height where the load may be located on the ground and the load disengaged from the retractable engagement means.

In a preferred form of the invention, the main frame includes a pair of spaced apart arms in substantial alignment with the pair of spaced apart arms of the sub-frame.

The main frame may include an upstand frame portion that has a vertical track along which the sub-frame may be moved vertically.

Preferably, the retractable engagement means comprise spring mounted catch means adapted to engage within apertures present in the load.

In a preferred embodiment, there are four spring mounted catch means located in symmetrical relationship on the sub-frame and the load is a crate.

Preferably, the spring-mounted catch means have a spring resistance whereby they will readily engage the load when the load is located on the ground and the trolley is maneuvered so that the spaced apart arms of the sub-frame are located on opposed sides of the load.

Preferably, the linkage means includes pulley means supported on the upstand frame portion, the or each pulley means engaging a cable that is rigidly connected at one of its ends to the handle and at the other of its ends to the sub-frame.

The pulley means preferably comprises two pulleys located on opposed sides of the upstand frame portion.

The first releasable catch assembly may include a first spring mounted latch pivotally mounted on the upstand frame portion and a first pin extending from the handle, the first pin being engaged by the first latch so as to lock the handle in an upright orientation to the main frame.

The first spring mounted latch may be pivotally mounted on a cross strut of the upstand frame portion at a height above the ground for operation by the foot of a user.

Preferably, the first spring mounted latch is pivotable about a vertical axis.

The second releasable catch assembly preferably includes a second spring mounted latch pivotally mounted on the sub-frame and a second pin extending from the upstand frame portion, the second pin being engaged by the second latch so as to lock the sub-frame to the main frame.

Preferably, the second spring mounted latch is pivotable about a horizontal axis.

The second spring mounted latch may be pivotally mounted on a cross member of the sub-frame.

In a preferred form of the invention, the second spring mounted latch has an aperture formed therein that receives the second pin therewithin.

The aperture is preferably obliquely shaped downwardly and has a mouth with a saw tooth structure defining an upper part of the mouth.

The lower part of the mouth is preferably defined by a downwardly sloping surface.

The second spring mounted latch may be operated by a hand grip lever located on the handle and operably connected by a cable to the second latch.

Preferably, compressing the hand grip lever will cause the second latch to pivot in a direction so as to disengage the second pin therefrom only after the first latch is disengaged from the first pin and the handle pivotally moved so that the second pin slides out of the obliquely shaped aperture downwardly along the sloping surface of the lower part of the mouth so as to clear the saw tooth structure.

The saw tooth structure preferably obstructs pivotal movement of the second latch in a direction that would cause disengagement of the second pin therefrom unless the first latch is disengaged from the first pin and the handle pivotally moved so that the second pin slides out of the obliquely shaped aperture downwardly along the sloping surface of the lower part of the mouth so as to clear the saw tooth structure.

BRIEF DESCRIPTION OF THE DRAWINGS

In order that the invention may be more readily understood and put into practical effect, the reference will be made to the accompanying drawings, in which:

FIG. 2 is a side elevational view of the lifting trolley of FIG. 1 with the handle in an upright position;

FIG. 3 is a side elevational view of the lifting trolley of FIGS. 1 and 2 with the handle in a position inclined to the vertical;

FIG. 4 is a front view of the lower parts of the main frame and sub-frame of the lifting trolley of FIGS. 1 through 3 with a stack of crates engaged thereto shown in dotted outline;

FIG. 5 is a side elevational view of a lifting trolley according to a second embodiment of the invention with the handle in an upright position;

FIG. 6 is a side elevational view of the lifting trolley of FIG. 5 with the handle in a position inclined to the vertical;

DETAILED DESCRIPTION OF THE PREFERRED EMBODIMENT

Figure 1:
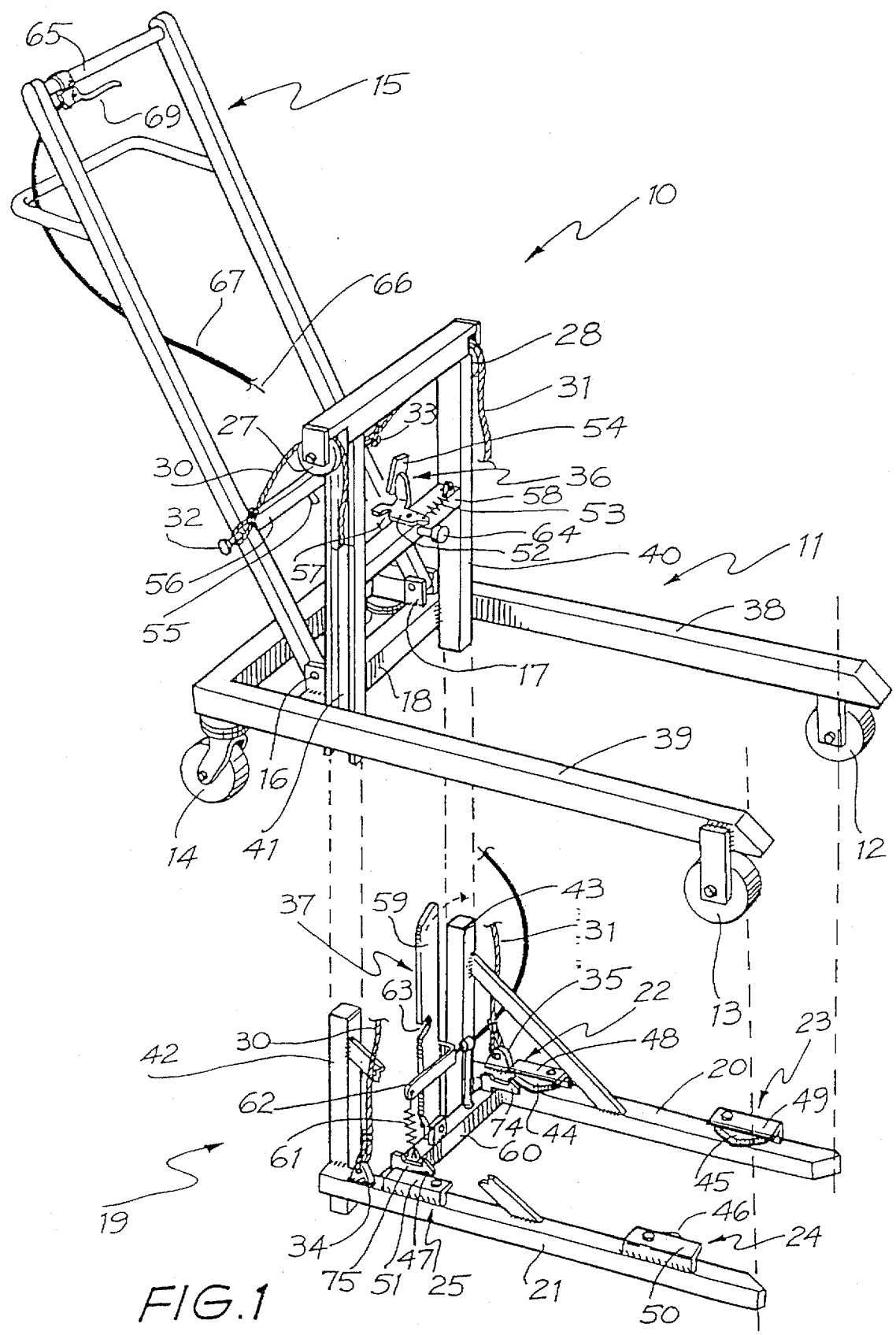
FIG. 1 is a perspective view of a lifting trolley according to a first embodiment of the invention in which the sub-frame is shown disassembled from the main frame.

The trolley 10 shown in FIGS. 1 through 4 has a main frame 11 supported on four symmetrically located ground engaging wheels (only wheels 12, 13 and 14 shown). Front wheels 12 and 13 are fixed and rear wheels 14 may swivel in the conventional manner. In a particular application, this wheel arrangement enables the trolley 10 to be rolled onto a moving conveyer, while the rear wheels swivel to accommodate any movement for the purpose of rapidly and reliably removing stacks of crates from the conveyor.

There is a handle 15 pivotally connected to the main frame 11 about bracket and pin assemblies 16 and 17 which are welded onto a cross member 18 of the main frame 11.

A sub-frame 19, which is vertically movable with respect to the main frame 11, has a pair of spaced apart arms 20 and 21 and each said arm has a pair of retractable engagement means 22, 23, 24 and 25 in symmetrical relationship, which are adapted to secure a load, such as the stack of crates 26 shown in FIG. 4, to the sub-frame 19 by engaging within the correspondingly located apertures present in the load.

Each retractable engagement means comprises spring mounted pivoting catch members 44, 45, 46 and 47, each partially enclosed in a casing member 48, 49, 50 and 51. The spring resistance of the catch members 44 through 47 is such that they will readily engage the load when the load is located on the ground and the trolley 10 is maneuvered so that the arms 20 and 21 are located on opposed sides of the load.

Linkage means between the handle 15 and sub-frame 19, in this embodiment, includes two pulleys 27 and 28 located on opposed sides of an upstanding frame portion 40 of the main frame 11 and engaging cables 30 and 31 that are each rigidly connected at one of their respective ends to pins 32 and 33 mounted on opposite sides of the handle 15 and, at the other of their respective ends, to lugs 34 and 35 mounted on the sub-frame 19. This linkage means ensures that pivotal movement of the handle 15 causes vertical movement of the sub-frame 19 with respect to the main frame 11.

A releasable catch means that locks the sub-frame 19 to the main frame 11 includes a first releasable catch assembly 36 for locking the handle 15 to main frame 11 at a first height of the sub-frame 19 (see FIG. 2) necessary for enabling the retractable engagement means 22 through 25 to engage the stack of crates 26 located on the ground (see FIG. 4). When the first catch assembly 36 is released, the handle 15 may be pivotally moved so as to cause the sub-frame 19 to be raised or lowered to a desired height.

The releasable catch means also includes a second releasable catch assembly 37 for locking the sub-frame 19 to the main frame 11 at a second height of the sub-frame 19 (see FIG. 3) necessary for transporting the load on the trolley 10.

In use, when the first catch assembly 36 is released and the handle 15 pivoted to a predetermined inclination to the vertical, such as shown in FIGS. 1 and 3, the sub-frame 19 will be raised, thereby raising the load, to the second height where the second catch assembly 37 locks the sub-frame 19 to the main frame 11 and the load may be transported. When the second catch assembly 37 is released and the handle 15 pivoted to a predetermined inclination to the vertical, the sub-frame will be lowered, thereby lowering the load to the said first height where the load may be located on the ground. The load may then be disengaged from the retractable engagement means 22 through 25.

In a preferred construction, the main frame 11 includes a pair of spaced apart arms 38 and 39 in substantial alignment with the arms 20 and 21 of the sub-frame 19 (see FIG. 4).

An upstanding frame portion 40 of the main frame 11 has a pair of vertical tracks (only track 41 is shown) along which upstand leg members 42 and 43 of the sub-frame 19 may slide in a vertical direction.

Referring to the first releasable catch assembly 36 in greater detail, there is a first pivotable latch 52 mounted on a cross strut 58 of the upstand frame portion 40, a spring 53 therefor having one end mounted to the latch 52 and its other end mounted to the upstand frame portion 40, a foot press member 54 and a pin 55 on a cross member 56 of the handle 15 that can engage the latch aperture 57. The foot press member 54 is so located relative to the vertical pivotal axis of the latch 52 that, upon application of foot pressure thereon, the latch 52 may disengage the pin 55 so as to allow the handle to be pivoted from an upright orientation to a position inclined to the vertical.

The second releasable catch assembly 37 includes a second pivotable latch 59 mounted on a cross member 60 of the sub-frame 19, a spring 61 therefor having one end mounted to the cross member 60 and its other end mounted to a terminal portion of an L-shaped arm 62 of the latch 59, and an aperture 63 formed in the latch 59 that can engage a pin 64 mounted on the cross strut 58.

The catch assembly 37 may be operated in part by a hand grip lever 69 mounted on cross member 65 of handle 15, the lever 69 controlling the movement of a cable 66 within a sheath 67 in the conventional manner. The end of the cable 66 furthermost from the lever 69 is connected to the L-shaped arm 62 adjacent to where the arm 62 is connected to the latch 59 so that compressing the hand grip lever 69 will, when the pin 64 is not engaged within the aperture 63, cause the latch 59 to pivot about its horizontal pivotal axis.

The aperture 63 is obliquely shaped downwardly so that its mouth is defined on the upper side by a downwardly depending sharp saw tooth structure and, on the lower side, by a downwardly sloping surface or concave surface profile.

When the pin 64 is engaged within the aperture 63, thereby locking the sub-frame 19 to the main frame 11, compression of the grip lever 69 alone (when the handle 15 is in an upright position) will not cause disengagement of pin 64 from aperture 63 because of the shape of the aperture 63 and the fact that the weight of the sub-frame 19 and any load carried thereon is supported by the pin 64. It is the saw tooth structure which effectively obstructs pivotal movement of the latch 59 in this situation.

Pivotal movement of the latch 59 will only be possible after the first latch 52 is disengaged from its pin 55 and the handle 15 is pivotally moved so that the second pin 64 slides out of the aperture 63 downwardly along the sloping surface that defines the lower side of the mouth of aperture 63 to an extent where the pin 64 clears the saw tooth structure. Sufficient clearance occurs when pin 64 is located on a horizontal plane below that of the saw tooth structure.

Only when such clearance has been achieved can the grip lever 69 be operated to pivotally move latch 59 away from pin 64.

When the handle 15 is in its locked upright position suitable for movement of the trolley 10 to a location for loading thereon a load, such as a crate stack or the like, the pin 64 is located against the latch 59 just above the mouth of aperture 63 so that the latch is slightly inclined to the vertical.

The cross member 60 includes two hooks 74 and 75 (see FIG. 1) which are adapted to engage the bottom of the second lowest crate in a crate stack when the sub-frame 19 is in its raised position. The hooks 74 and 75 prevent disengagement of the load from the trolley 10 in cases where the trolley is stopped suddenly in a forward direction. Only the lowering of the sub-frame 19 to the ground or the like, such as onto a floor trolley (commonly known as a dollie) will cause the second lowest crate to be disengaged from the hooks 74 and 75.

A typical sequence of operation for the lifting and release of a crate stack by trolley 10 will now be described.

The crate stack may be lifted from the ground or from a raised platform, such as a floor trolley.

The arms 12, 13 of the trolley 10 are, by suitable maneuvering of the trolley, located on opposite sides of the crate stack so that the catch members 44 through 47 engage correspondingly located holes in the lowest crate in the stack (see FIG. 4).

In the case of lifting from a raised platform, the level of the catch members 44 through 47 must be elevated so as to accommodate the increased height of the lowest crate of the stack. This is achieved by pivoting the handle 15 downwardly to a sufficient degree to set the height of the catch members 44 through 47 before maneuvering the trolley 10 as described above. Once the catch members 44 through 47 are engaged, the trolley with its load may be wheeled away from the raised platform. Upon clearing the raised platform, the handle 15 may be pivoted to its locked upright position for transporting the crate stack.

When lifting a crate stack from the ground, the trolley 10 has its handle 15 in its locked upright position for engagement of the catch members 44 through 47.

The catch assembly 36 is then released or disengaged and the handle 15 pivoted rearwardly to lift the sub-frame 19 so that the latch 59 slides upwardly against the pin 64. In this operation, the crate stack is lifted off the ground. When the pin 64 encounters the mouth of aperture 63, the latch 59 springs into engagement with the pin 64.

The pin 64, having entered the aperture 63, is retained therein under the weight of the crate stack and by the shape of the aperture 63. The height of the crate stack off the ground is substantially equal to the vertical distance traveled by the latch 59 against the pin 64.

The handle 15 is then returned to its locked upright position for transporting the crate stack.

If necessary, there may be additional apertures in latch 59 below aperture 63 so as to enable the crate stack to be transported at a greater height above the ground.

In order to release the crate stack onto the ground or the like, the catch assembly 36 is once again released or disengaged and the handle 15 pivoted rearwardly so that the latch 59 is caused to slide upwardly against the pin 64 until the pin 64 is located outside the mouth of aperture 63 or at least horizontally below the overhanging saw tooth structure of aperture 63. There is a slight lifting of the crate stack during this operation which may be useful when the crate stack is to be lowered onto a raised platform. The height of any raised platform onto which the stack is to be lowered will, in this case, determine the degree to which the handle 15 is pivoted rearwardly.

The hand grip lever 69 is then compressed so as to cause latch 59 to pivot clear of pin 64. Whilst gripping the lever 69, the handle 15 is pivoted back to its locked upright position. In this operation, the crate stack is lowered onto the ground or the like.

The grip lever 69 is then released causing the latch 59 to be pressed against the pin 64 just above the mouth of aperture 63, such as at the beginning of this operation sequence.

The trolley is then wheeled in reverse so that the catch members 44 through 47 disengage their holes in the lowest crate in the stack and the trolley 10 may then be reused.

The trolley 70 shown in FIGS. 5 and 6 differs from trolley 10 shown in FIGS. 1 through 4 only in the structure of its linkage means. Identical features of trolleys 10 and 70 have the same numerals as for FIGS. 1 through 4. The pulley means of trolley 10 has been replaced in trolley 70 by a pair of simplified linkage assemblies, each comprising an arm 71 welded to the handle 15 and a shortened cable 72 fixed at one of its ends to the terminal portion of arm 71 and at the other of its ends to lug 34 or 35 on the sub-frame 19. The operation of trolley 70 is otherwise identical to that of trolley 10 and is shown in FIGS. 5 and 6.

Figure 7A:
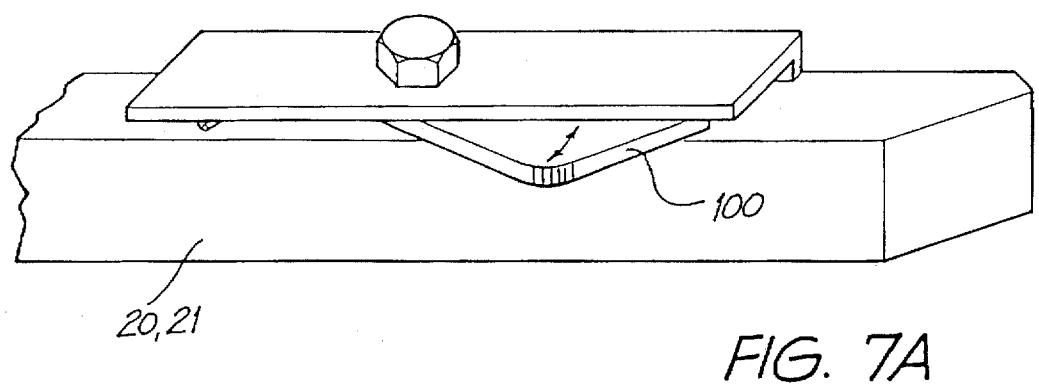
FIG. 7A is an enlarged side elevational view of one of the pivoting catch members according to the trolley of FIGS. 1, 3, 4 and 6.
Figure 7B:
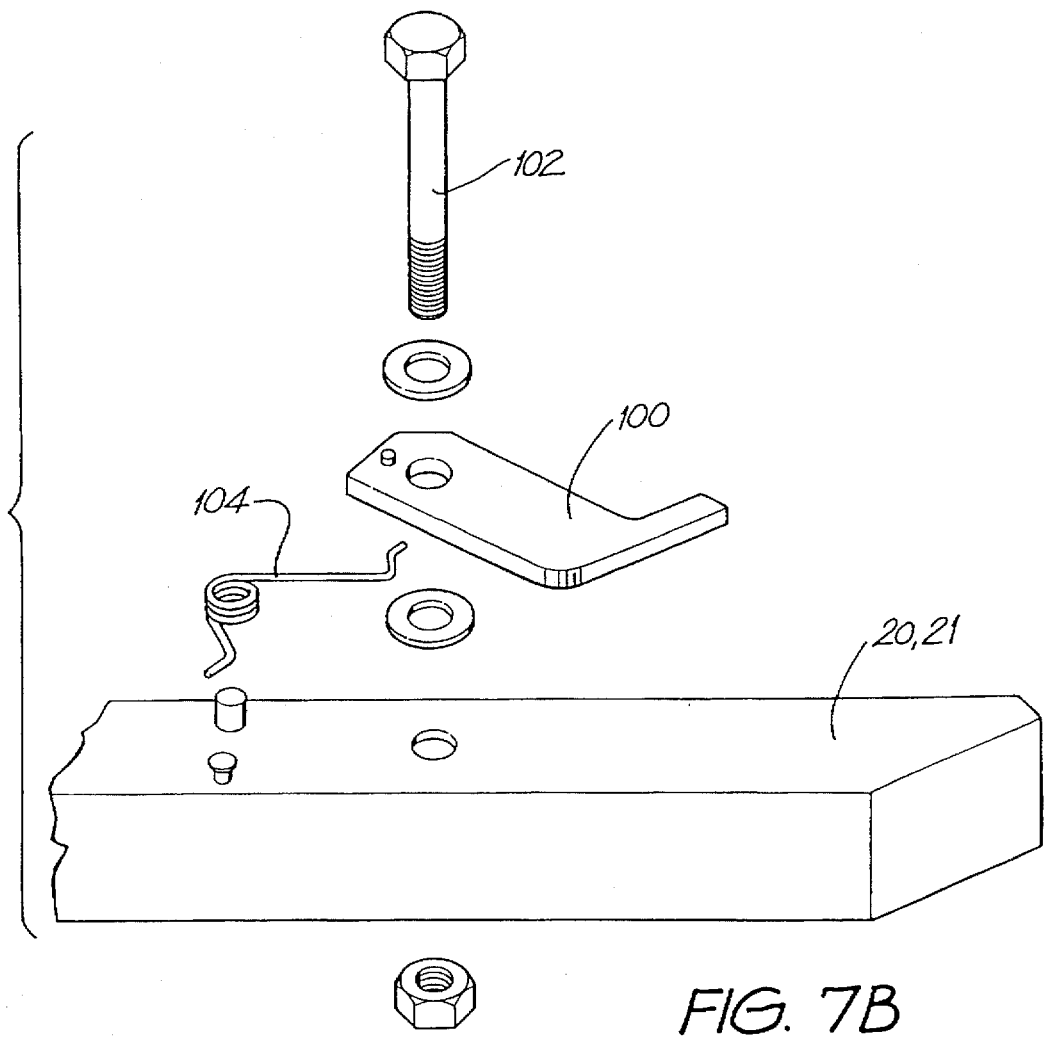
FIG. 7B is an exploded side elevational view of one example for implementing the pivoting catch members according to FIG. 7A.

FIGS. 7A and 7B illustrate one example for implementing the catch members 44 to 47 as would be understood by one of skill in the art. With reference to FIG. 1, the catch members 44 to 47 are each formed with an arcuately- or triangularly-shaped pivot element 100. With reference to FIGS. 3, 4 and 6, each pivot element includes a cylindrical post 102 around which the pivot element 100 moves at one longitudinal end thereof. The pivot element 100 of each catch member 44 to 47 is spring mounted using, for example, a conventional spring element 104, where one end of the spring element 104 is fixedly mounted to the arm 20, 21 and the other end is fixedly mounted to the pivot element 100. The spring element 104 in each catch member 44–47 is formed with or generates enough spring tension to hold the catch members in place, but to elastically deform when the catch members are moved by an outside force, such as through an outside surface of a load pushing against the catch member as the load is being engaged/disengaged or an operator manually pushing against the catch members.

In operation, the catch members 44–47 are pushed in against the spring tension of their corresponding spring elements 104 when the catch members come into sliding contact with the outer surfaces of the load. When the holes align with the catch members, the catch members will spring back into position. Other configurations for the catch members 44 to 47 and/or their individual components, as would be known in the art, may be applicable to the present invention.

Various modifications and amendments may be made in detail of design and construction without departing from the scope and ambit of the appended claims.

What is claimed is:

1. A lifting trolley comprising:

a main frame supported on ground engaging wheels;

a handle pivotally connected to the main frame;

a lifting sub-frame vertically movable with respect to the main frame along a vertical track of an upstand frame portion of the main frame;

the sub-frame including a first pair of spaced apart arms, each arm including engagement means for securing a load to the sub-frame;

linkage means operatively connecting the handle with the sub-frame for vertically moving said sub-frame, for translating pivotal movement of the handle into vertical movement of the sub-frame with respect to the main frame; and releasable catch means for locking the sub-frame to the main frame, wherein the releasable catch means includes a first releasable catch assembly for locking the handle to the main frame at a first height of the sub-frame for enabling the engagement means to engage a load located on the ground, and a second releasable catch assembly for locking the sub-frame to the main frame at a second height of the sub-frame for transporting the load on the trolley, the first releasable catch assembly including a first spring mounted latch pivotally mounted on the upstand frame portion and a first pin extending from the handle, the first pin being engaged by the first latch so as to lock the handle in an upright orientation to the main frame, and the second releasable catch assembly including a second spring mounted latch pivotally mounted on the sub-frame and a second pin extending from the upstand frame portion, the second pin being engaged by the second latch so as to lock the sub-frame to the main frame, and wherein said linkage means operatively connects the handle with said sub-frame, whereby pivoting the handle in a first pivotal direction raises the sub-frame, correspondingly raising the load, to the second height where the second releasable catch assembly locks the sub-frame to the main frame, and further, pivoting the handle in a second pivotal direction lowers the sub-frame, correspondingly lowering the load, to said first height for disengaging the load from the engagement means.

2. The trolley of claim 1 wherein the main frame includes a second pair of spaced apart arms aligned with the first pair of spaced apart arms of the sub-frame.

3. The trolley of claim 1, wherein the engagement means comprises spring mounted pivoting catch means for engaging with apertures present in the load under influence of a spring and for retracting pivotally from the apertures when the load is to be disengaged from the engagement means.

4. The trolley of claim 3, wherein the engagement means comprises four spring mounted catch means located in symmetrical relationship on the sub-frame each for engaging with a load that is a crate.

5. The trolley of claim 4, wherein each of the spring mounted catch means has a spring resistance to readily engage the load when the first pair of spaced apart arms of the sub-frame are positioned on opposed sides of the load.

6. The trolley of claim 1, wherein said linkage means includes a pulley supported on the upstand frame portion, and said linkage means includes a cable that is connected at a first end to the handle and operatively connected at a second end to the sub-frame via said pulley.

7. The trolley of claim 1, wherein the first spring mounted latch is pivotally mounted on a cross strut of the upstand frame portion and includes means for being operated by the foot of a user.

8. The trolley of claim 1, wherein the second spring mounted latch is pivotally mounted on a cross member of the sub-frame.

9. The trolley of claim 8, wherein the second spring mounted latch has an aperture formed therein for receiving the second pin therewithin, and the aperture is obliquely shaped downwardly and has a mouth with a saw-tooth structure defining an upper part of the mouth, and the lower part of the mouth is defined by a downwardly sloping surface.

10. The trolley of claim 9, wherein the second spring mounted latch includes a hand grip operating lever located on the handle, and a cable operatively connecting the lever to the second spring mounted latch.

11. The trolley of claim 10, wherein the hand grip lever includes means for pivoting the second spring mounted latch to disengage the second pin therefrom after the first latch is disengaged from the first pin and the handle is pivotally moved, whereby the second pin slides out of the obliquely shaped aperture downwardly along the sloping surface of the lower part of the mouth and clear of the saw-tooth structure.

12. The trolley of claim 11, wherein the saw-tooth structure includes means for obstructing the pivotal movement of the second latch that disengages the second pin therefrom unless the first latch is disengaged from the first pin and the handle pivotally is moved.

* * * * *